May 27, 1941.   B. W. SEWELL   2,243,398
PRESSURE MEASURING DEVICE
Filed April 21, 1939
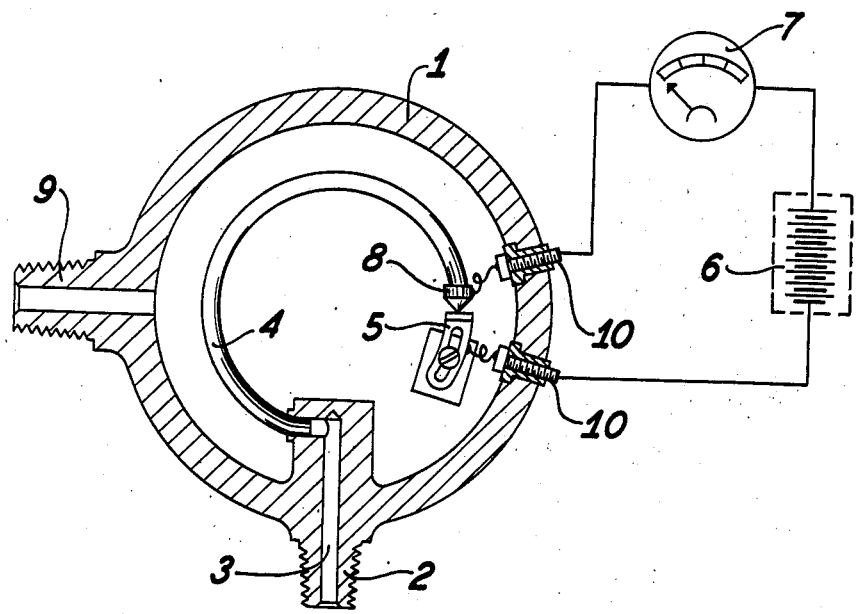
INVENTOR.
BY Benjamin W. Sewell
ATTORNEY.

Patented May 27, 1941

2,243,398

UNITED STATES PATENT OFFICE 2,243,398

PRESSURE MEASURING DEVICE

Benjamin W. Sewell, Tulsa, Okla., assignor to Standard Oil Development Company, a corporation of Delaware Application April 21, 1939, Serial No. 269,169

2 Claims. (Cl. 73—109)

The present invention is directed to a device to be employed for determining the pressure inside a closed chamber.

In many cases samples of high pressure fluids are collected in closed chambers under conditions such that the use of ordinary pressure gauges would be impractical or impossible. To be specific, samples of subsurface formation fluid or solid and fluid are collected in sampling tubes and brought to the surface for examination. It becomes important to know what is the pressure inside the sampling tube so that it can be decided whether or not the sample was actually collected at formation pressure. Any attempt to attach a pressure gauge to the tube at the surface usually results in a loss of the pressure in the chamber since in most cases it is liquid pressure.

According to the present invention a simple rugged device is provided for use in conjunction with such sampling tubes. Essentially this device is an attachment for such tubes or chambers which includes a pressure responsive element arranged to be exposed to the pressure in the chamber or tube, an electric circuit of which this element is a part and which is either made or broken by the pressure exerted on the element from the chamber or tube, and means for supplying pressure to the other side of the pressure responsive element so as to restore said element to its normal position, the pressure required for this purpose being equal to the pressure in the chamber or tube.

The present invention will be better understood from the following detailed description of the accompanying drawing in which—

The sole figure is a front elevation, partly in section, of one embodiment of the present invention.

Referring to Figure 1 in detail, numeral 1 designates a casing made sufficiently strong to withstand the pressures which are to be measured. On one side of casing 1 is a nipple 2 adapted to be screwed into the wall of the chamber the pressure in which is to be measured. In nipple 2 is a passage 3 terminating in a Bourdon tube 4, the free end of which is normally in contact with a contact plate 5 which is insulated from the casing and to which is attached one of a pair of binding posts 10 the other of which is attached to the end 8 of the Bourdon tube. A battery 6 has its terminals connected to the binding posts through a meter 7. The chamber 1 is also provided with a second nipple 9 which is adapted to be connected to an adjustable source of pressure which will include means for indicating the numerical value of the pressure.

In the use of this device it is attached to the sampling chamber. As the pressure builds up in the sampling chamber the Bourdon tube is distorted, thereby separating point 8 from plate 5. When it is desired to determine the pressure in the chamber, the nipple 9 is connected to the adjustable source of pressure and the battery terminals are connected to binding posts 10 through the meter 7. Pressure is then built up inside of chamber 1 until the Bourdon tube is restored to its normal position, that is, with point 8 in contact with plate 5, and the circuit is thus closed. The pressure at the point at which the circuit is just closed is the pressure in the chamber.

It will be apparent that many changes may be made in the device described above without departing from the scope of the present invention. For example, it is within the skill of the mechanic to so arrange the pressure responsive device that it will either make or break a circuit when the pressure to be measured is impressed upon it. Other changes in arrangement are contemplated within the scope of the appended claims in which it is intended to claim this invention as broadly as the prior art permits.

I claim:

1. A device for measuring pressure in a closed chamber comprising an arcuate tube having a closed end and an open end for communication with said chamber whereby the arc of said tube varies with the pressure in said chamber, a source of electrical power having one of its terminals connected to the free end of said tube and the other of its terminals arranged adjacent the free end of said tube, and means for applying pressure to the exterior of said tube.

2. A device for measuring pressure in a closed chamber which comprises an auxiliary chamber adapted to be attached in communication with said closed chamber, a Bourdon tube arranged in said auxiliary chamber having its open end in communication with said closed chamber, a source of electrical power having one of its terminals connected to the free end of said Bourdon tube and its other terminal arranged adjacent the free end of said tube in a position to contact the free end of said tube when the latter is in its normal position, and means for applying fluid pressure to the interior of said auxiliary chamber.

BENJAMIN W. SEWELL.